United States Patent Office

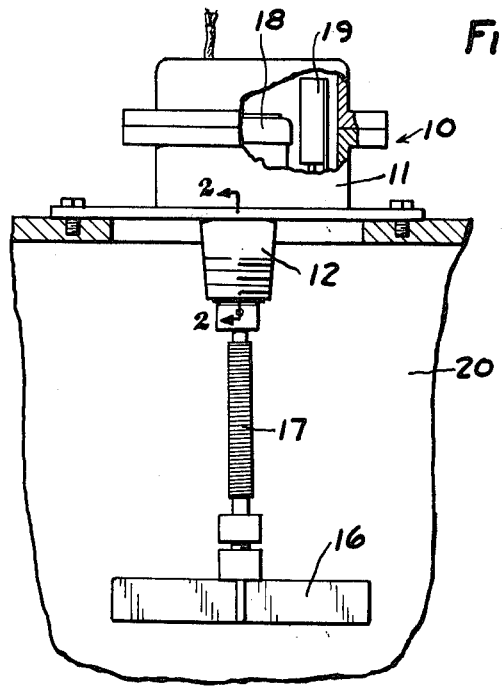
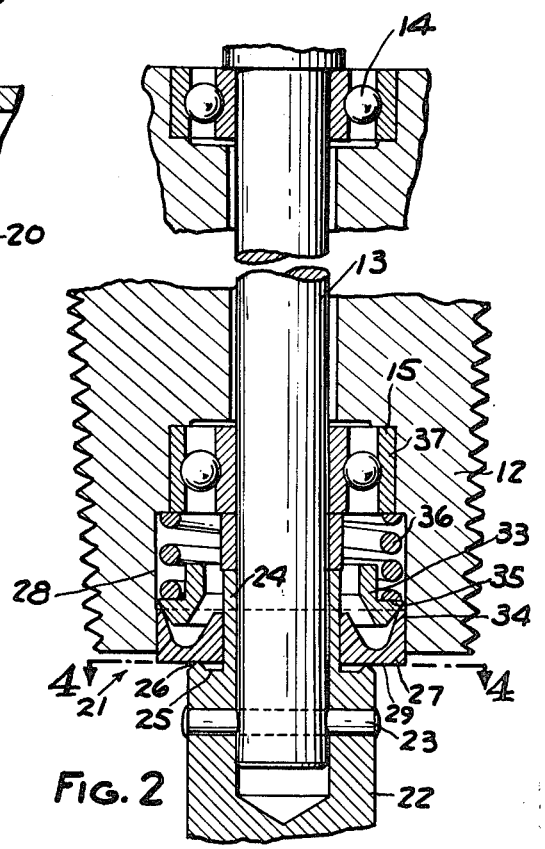
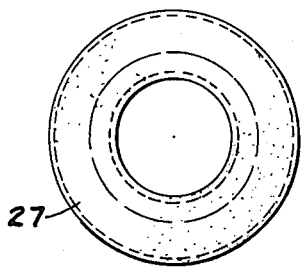
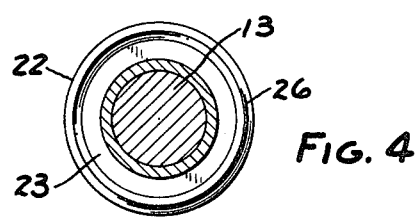
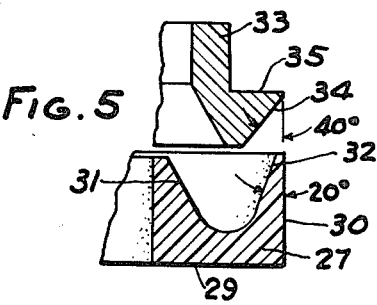

3,175,831
Patented Mar. 30, 1965

3,175,831
ROTARY SEAL ASSEMBLY
Norman L. Grostick, Lexington, Mich., assignor to The Bin-Dicator Company, Detroit, Mich., a corporation of Michigan
Filed Feb. 5, 1962, Ser. No. 170,962
6 Claims. (Cl. 277—84)

This invention relates to sealing around a slowly turning shaft that is being driven at relatively low torque.

In various devices such as the bin level indicator shown in the patent to Grostick, 2,851,553, issued September 9, 1958, a shaft is rotatably mounted in a housing and driven at a slow turning rate by a low torque motor such as a hysteresis motor. A paddle on the end of the shaft is adapted to be engaged by the pulverulent material in the bin and thereby interrupt the rotation of the shaft. This rotation is transmitted through the hysteresis motor to a sensing mechanism within the housing. In such a device, it is desirable to provide a rotary seal which will prevent moisture and dust-laden air from entering the housing and which will withstand abrasive action, chemical action, moderate air pressure and moderate temperature. At the same time, the rotary seal should not place an undue force upon the low torque motor.

It is an object of this invention to provide a rotary seal assembly which will effectively prevent the entrance of moisture and dust-laden air into the housing from the exterior of a shaft that is driven at low turning speed by a low torque drive; which will withstand abrasive action, chemical action, moderate air pressure, and moderate temperature; and which is relatively simple and low in cost.

Basically, the rotary seal assembly embodying the invention comprises a generally radial shoulder on the shaft exteriorly of the housing and an annular rib on the shoulder which is adapted to engage a radial surface of an annular circumferentially continuous unsplit packing ring made of a low friction material. The packing ring is yieldingly urged axially to bring the radial surface into contact with the rib on the shoulder and thereby provide a rotary seal and includes an axial surface which is yieldingly urged outwardly into contact with an axial surface on the housing to provide a static seal so that a radial static seal and an axial rotating seal are provided.

In the drawings:

FIG. 1 is a part sectional view showing a bin level indicator embodying the invention mounted in the top wall of a bin.

FIG. 2 is a fragmentary sectional view on an enlarged scale taken along the line 2—2 in FIG. 1.

FIG. 3 is a bottom plan view of a packing ring used in the rotating seal assembly.

FIG. 4 is a sectional view taken along the line 4—4 in FIG. 2.

FIG. 5 is a fragmentary exploded view showing a portion of the sealing assembly of FIG. 2.

Referring to FIG. 1, the rotary seal assembly embodying the invention is particularly adapted for use with a bin level indicator 10 comprising a housing 11 that has an integral tubular extension 12. A shaft 13 is rotatably mounted in the tubular extension 12 by spaced bearings 14, 15. The end of the shaft projects beyond the lower end of the extension 12. A paddle 16 is fixed to the lower end of the shaft through a helical spring shaft 17. A hysteresis motor 18 is fastened to the upper end of the shaft 13 and is adapted to actuate a sensing mechanism in the form of a switch 19 when the rotation of the shaft 13 is interrupted by the pulverulent material in the bin 20.

The hysteresis motor 18 drives the shaft 13 at a slow turning rate and has a low torque. It is desirable to prevent moisture and dust-laden air from the interior of the bin 20 from entering the housing 11.

In accordance with the invention, a rotary seal assembly 21 is provided in the lower end of the tubular extension surrounding the shaft 13 to provide both a static and rotary seal.

As shown in FIG. 2, a shaft extension member 22 is fixed to the lower end of the shaft 13 by a pin 23. The upper end of the extension member 22 is tubular and surrounds the shaft 13 as at 24. The member 22 includes a shoulder 25 which extends generally radially and is formed with an integral annular rib 26 that is in the form of a V in cross section.

An annular circumferentially continuous unsplit packing ring 27 is provided in cylindrical opening 28 in the housing 12. As shown in FIG. 5, packing ring 27 is generally U-shaped in cross section and includes a radial annular surface 29 and an axial outer peripheral and cylindrical surface 30. In addition, the packing ring 27 includes an inner frusto-conical surface 31 and an outer frusto-conical surface 32.

The packing ring is preferably made of a low friction organic plastic which has slight radial elongation such as tetrafluoroethylene more commonly known under the trademark Teflon, as manufactured by E. I. du Pont de Nemours, of Wilmington, Delaware.

An annular pressure ring 33 is provided within the cavity 28 and includes an outer frusto-conical peripheral surface 34 that is adapted to bear on the surface 32 of the packing ring. As shown in FIG. 5, the angle which the surface 34 on pressure ring 33 makes with the horizontal is preferably less than the angle which the surface 34 of the packing ring 27 makes with the horizontal. Thus, the angle of the surface 34 may be 50° and the angle of the surface 32 may be 20°.

Pressure ring 33 is formed with an annular shoulder 35 and a coil spring 36 is interposed between the shoulder 35 and outer race 37 of the ball bearing 15. This yieldingly urges the surface 34 of pressure ring 33 against the surface 32 of the packing ring 27.

By this arrangement, the outer surface 30 of packing ring 27 is yieldingly urged into contact with the cylindrical wall of cavity 28 to provide a static seal and the radial surface 29 of packing ring 27 is yieldingly urged against the rib 26 on shoulder 25 to provide a rotary seal. The Teflon ring 27 remains stationary during rotation of the shaft 13.

The provision of the sharp rib or bead 26 causes an extrusion of the packing ring material to insure a uniform and tight seal. By making the rib a sharp V in cross section, the surface contact between the packing ring 27 and the shaft 22 is reduced, thereby eliminating unnecessary drag which would be detrimental to the rotation of the shaft since it is being driven at low torque and slow speed.

The seal which is formed effectively prevents the entry of moisture and dust-laden air into housing 12. The seal resists abrasion, is inert to many chemicals, is self-compensating to wear and is relatively low in cost.

Extensive tests of the rotary seal indicate its effectiveness not only to prevent the entry of moisture and dust-laden air but, in addition, to resist substantial air pressure differential between the interior and exterior of the housing. The provision of the novel rotary seal including pin 23 which is solidly riveted over at the ends insures that there is no leakage of air between the vicinity of the shaft and into the interior of the housing.

I claim:

1. In a rotary seal construction, the combination comprising a housing,
   a shaft mounted for rotation in said housing and having one end thereof projecting beyond said housing, said housing having a generally cylindrical cavity surrounding and extending axially of said shaft,
a member fixed on said shaft and defining a shoulder surface extending generally radially adjacent said cavity,
a packing ring of low friction material positioned in said cavity adjacent said shaft and surrounding said shaft,
said packing ring having a generally axial cylindrical surface and a generally radial surface,
said packing ring being circumferentially continuous and unsplit and capable of slight radial elongation,
said radial shoulder including an annular rib engaged by the radial surface of said packing ring,
said packing ring having an annular groove therein in the side thereof opposite said radial surface defining a frusto-conical surface opposite said axial surface,
and a pressure ring having a generally complementary frusto-conical surface contacting said frusto-conical surface of said packing ring,
said pressure ring contacting said packing ring only at said frusto-conical surface of said packing ring,
means interposed between the bottom of said cavity in said housing and said pressure ring yieldingly urging said pressure ring against said frusto-conical surface of said packing ring to force the free edge of said axial surface of said packing ring into static sealing contact with the wall of said cavity and said radial surface of said packing ring into rotary sealing contact with said shoulder.

2. In a rotary seal construction, the combination comprising a housing,
a shaft mounted for rotation in said housing and having one end thereof projecting beyond said housing,
said housing having a cylindrical cavity surrounding and extending axially of said shaft,
a member fixed on said shaft and defining an annular shoulder surface extending radially adjacent said cavity,
a packing ring of low friction material positioned in said cavity adjacent said shaft and surrounding said shaft,
said packing ring having an axial cylindrical surface and a radial surface,
said packing ring being circumferentially continuous and unsplit and capable of slight lateral flexing,
said radial shoulder surface including an annular rib engaged by the radial surface of said packing ring,
said packing ring being V-shaped in cross section and having a frusto-conical surface in the side thereof opposite said radial surface opposite said axial surface,
and a pressure ring having a generally complementary frusto-conical surface of said packing ring,
said pressure ring contacting said packing ring only in the area of the frusto-conical surface of said packing ring,
means interposed between the bottom of said cavity of said housing and said pressure ring yieldingly urging said pressure ring against said frusto-conical surface of said packing ring to force said free edge of said axial surface of said packing ring into static sealing contact with the wall of said cavity and said radial surface of said packing ring into rotary sealing contact with said shoulder.

3. The combination set forth in claim 2 wherein said packing ring is made of organic plastic material.

4. The combination set forth in claim 2 wherein said packing ring is made of Teflon.

5. In a rotary seal construction, the combination comprising a housing,
a shaft mounted for rotation in said housing and having one end thereof projecting beyond said housing,
said housing having a cavity surrounding said shaft,
a member fixed on said shaft and defining a shoulder surface extending radially adjacent said cavity,
a packing ring of low friction material positioned in said cavity adjacent said shaft and surrounding said shaft,
said packing ring having an axial cylindrical surface and a radial surface,
said packing ring being circumferentially continuous and unsplit and capable of slight radial elongation,
said radial shoulder surface including an annular rib engaged by the radial surface of said packing ring,
said packing ring having an annular groove therein in the side thereof opposite said radial surface defining a frusto-conical surface opposite said axial surface,
and a pressure ring having a generally complementary frusto-conical surface contacting said frusto-conical surface of said packing ring,
the frusto-conical surface of said packing ring forming a greater angle with the axis of said shaft than the frusto-conical surface of said pressure ring,
said pressure ring contacting said packing ring only at said frusto-conical surface of said packing ring,
means interposed between the bottom of said cavity in said housing and said pressure ring yieldingly urging said pressure ring against said frusto-conical surface to force the free edge of said axial surface of said packing ring into static sealing contact with the wall of said opening and said radial surface of said packing ring into rotary sealing contact with said shoulder.

6. In a rotary seal, the combination comprising
a housing,
means for rotatably mounting a shaft in said housing,
said shaft having a shoulder thereon defining a generally inwardly facing radial surface adjacent a portion of said housing,
an annular packing ring,
said ring being circumferentially continuous and unsplit and being formed of a low friction material,
said ring having a generally axial peripheral surface and a generally radially outer surface adjacent said surface on said shoulder,
said packing ring having a frusto-conical inner surface opposite said axial peripheral surface,
said radial shoulder surface including an annular rib engaged by the radial surface of said packing ring,
and means for applying an axial yielding force to said frusto-conical surface of said packing ring only for urging said axial peripheral surface outwardly into contact with said housing to form a static seal and urging said radial surface of said ring axially against the surface of said shoulder to form a rotary seal.

References Cited by the Examiner
UNITED STATES PATENTS
2,320,794 6/43 Pew _____ 277—95 XR
2,964,340 12/60 Kinzie et al. _____ 277—87

FOREIGN PATENTS
896,876 11/53 Germany.

EDWARD V. BENHAM, Primary Examiner.
WALTER A. SCHEEL, Examiner.